United States Patent [19]

Chabat-Courrède

[11] 4,321,945

[45] Mar. 30, 1982

[54] DAMPED FLUID PRESSURE RELIEF VALVE

[75] Inventor: Jean Chabat-Courrède, Moret sur Loing, France

[73] Assignee: Electricite de France (Service National), Paris, France

[21] Appl. No.: 141,193

[22] Filed: Apr. 17, 1980

[30] Foreign Application Priority Data

Jan. 15, 1980 [FR] France ................................ 80 00842

[51] Int. Cl.³ ...................... F16K 47/00; F16K 15/06
[52] U.S. Cl. ................................................. 137/514.7
[58] Field of Search ............................ 137/514, 514.7; 251/335 B, 48

[56] References Cited

U.S. PATENT DOCUMENTS

| 1,379,092 | 5/1921 | Frascascia et al. ............. 137/514.7 |
| 2,568,026 | 9/1951 | Pigott .......................... 137/514.7 X |
| 2,686,534 | 8/1954 | Montelius ............................ 137/514 |
| 3,648,727 | 3/1972 | Huyck ............................ 137/514 X |
| 3,789,872 | 2/1974 | Elliott ................................ 137/514 |

*Primary Examiner*—William R. Cline

[57] ABSTRACT

A safety valve normally closed and having a flap which is biassed away from its seat against the action of resilient means whenever the fluid pressure which acts on the flap rises above a given value is disclosed. A hydraulic brake including a partition mounted inside a cylinder so as to define two liquid-filled chambers communicating with each other by calibrated passages is mounted between the flap and the resilient means, in the vicinity of the flap.

6 Claims, 3 Drawing Figures

DAMPED FLUID PRESSURE RELIEF VALVE

BACKGROUND OF THE INVENTION

The present invention relates to a safety valve of the type comprising a flap sealingly applied under normal conditions, against a seat under the action of resilient means, e.g. a calibrated spring, so as to obturate an opening made in a fluid-containing enclosure, said flap being biased away from said seat against the action of said spring, whenever the fluid-pressure rises beyond a given level.

As is well known, the operation of such a valve is controlled by the pressure within said fluid-containing enclosure. Whenever the pressure within said enclosure can be considered as normal, the flap is maintained sealingly applied against said seat by the calibrated spring. On the other hand, whenever the fluid-pressure reaches the value determined by the spring calibration, the flap is raised from its seat and lets the fluid flow until the pressure within the enclosure be again lower than said limit value. When such is the case, the flap is again sealingly applied against the seat and closes the valve. If the pressure within the enclosure continues to rise, the valve is again caused to open, whereupon it is again caused to close. Such movements of the valve may happen to occur repeatedly, in which case they submit the flap to the so-called "beat phenomenon".

When the fluid contained in the enclosure is a compressible one, it acts in the manner of a mattress and it damps down said beats, so that the frequency of the latter remains relatively low, without any damaging consequences as regards the whole equipment. On the other hand, when the fluid contained in said enclosure is incompressible, the beats are not damped down, so that the frequency thereof becomes very high. There occurs then an overheating in the guiding regions of the moveable parts and, in particular, in the flap. In some cases, such an overheating can be important enough for generating microwelds and inducing the scuffing of said movable parts, with the possible consequence of unfavorably maintaining the valve open and exhausting the enclosure. Moreover, in some cases, in particular when said valve belongs to the water-circuit of a nuclear power-plant, the fortuitous drainage of said circuit may lead to severe consequences as regard the whole installation.

The object of the present invention is to provide a safety valve of the above described type, capable of being installed in an enclosure filled with an incompressible fluid, while being free from the drawbacks of the safety-valves of the prior art. It must be noted however, that the scope of the present invention is not restricted to safety-valves adapted to be mounted in enclosures filled with an incompressible fluid, and that the invention also covers valves to be mounted in enclosures filled with a compressible fluid.

BRIEF SUMMARY OF THE INVENTION

To that end, a safety valve of the above-described type according to the invention is characterised in that a hydraulic brake is mounted between the flap and the resilient means, in the vicinity of said flap.

Owing to such a feature, the high-frequency oscillation of the movable parts are completely cancelled, even if the fluid contained in the enclosure is an incompressible one, so that the risk of scuffing the valve is eliminated. The flow of the fluid drained through the valve is thus improved, since it is uniformly varied, whereas the flow is of the pulsating type in the safety valves of the prior art.

According to a preferred embodiment said resilient means are connected to the flap by means of a stem that is integral with a partition mounted within a cylinder, so as to define two liquid-filled variablevolume chambers, communicating with each other by means of at least one calibrated passage. The said partition may comprise either a piston sliding within the cylinder, or a flexible diaphragm, the outer periphery of which is fixed to said cylinder.

According to a first variant, said calibrated passage is constituted by an outer conduit adapted to connect said two variable-volume chambers with each other.

According to a second variant, said calibrated passage is constituted by a hole made in the partition and opening into said two chambers.

In either of said two variants, and according to a secondary feature of the invention, said variablevolume chambers can be put in communication with each other by at least two passages of different cross-sections, said cross-sections being controlled by means of nonreturn flaps (or one-way flaps) mounted in opposite directions. Such a feature permits to control and distinguish the valve opening and closing steps, whatever be the nature of the fluid contained in the enclosure.

According to a third variant, when the partition is constituted by a piston, the calibrated passage is constituted by a clearance between the piston outer periphery and the cylinder.

According to another secondary feature of the present invention, said stem adapted to connect the resilient means to said flap, is constituted by three removable parts integral with said resilient means, with said flap and with said partition, respectively, so that said cylinder, the partition and that portion of said stem integral with the partition constitute a one-piece sub-assembly.

Another object of the present invention is to provide a hydraulic brake forming such a sub-assembly and capable of being inserted in a conventional safety valve.

BRIEF DESCRIPTION OF THE DRAWING

Various embodiments of the invention will be described hereafter, with reference to the accompanying drawing, in which.

DETAILED DESCRIPTION

Figure 1:
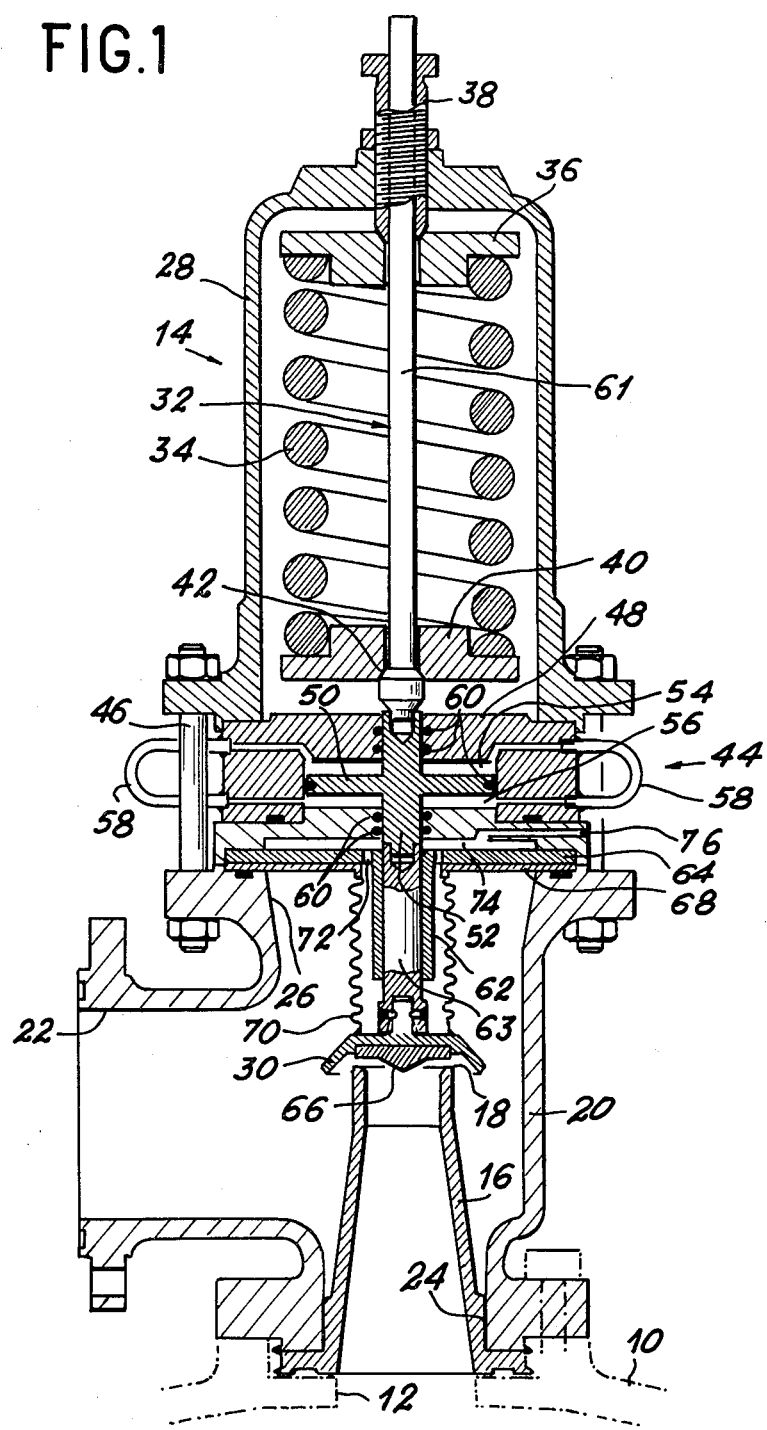
FIG. 1 is an axial cross-section of a safety valve into which, according to the invention, has been inserted a hydraulic brake for fully cancelling the highfrequency oscillations of the valve movable parts.

In FIG. 1, is shown in dash-and-dot line a portion of an enclosure 10 containing a fluid, the pressure of which must be maintained lower than a limit value. Said enclosure 10 can be constituted, e.g., by a tank containing the fluid in a static state, or by a circuit in which said fluid is caused to flow. Thus, for instance, the enclosure may be constituted by the water-circuit of a nuclear power-plant.

In order to prevent the pressure within enclosure 10 from rising above said limit value, said enclosure is provided with a circular opening 12, in which is mounted a safety valve, generally designated by reference numeral 14.

More specifically, a tube 16 is mounted in opening 12 and protrudes from enclosure 10 so as to form a valve seat 18 at the free extremity thereof. Said tube 16 is entirely contained in a T-shaped connecting member 20 for draining the fluid flowing from the enclosure through tube 16, via a secondary circuit (non shown) fixed to opening 22 of said member 20. The other two openings (24 and 26) of connecting member 20 are sealingly connected to enclosure 10 and to a bell-shaped member 28, respectively, said member 28 being coaxial with opening 12, so that all the fluid flowing from the enclosure via tube 16 is drained through opening 22 of said connecting member.

Safety valve 14 comprises a movable portion constituted by a flap 30 and by a stem 32. Said flap 30 is normally sealingly biassed against valve seat 18 by means of a calibrated helical spring 34 mounted inside bell-shaped member 28, between a flange 36 resting on a screw 38 that is screwed into the bottom portion of member 28, and a flange 40 resting on a shoulder 42 formed on stem 32. The calibration of said spring 34 is obtained by means of screw 38.

According to the present invention, a hydraulic brake, generally designated by reference numeral 44, is mounted on stem 32, between flap 30 and spring 34, in the immediate vicinity of said flap. More specifically, said hydraulic brake 44 is sealingly mounted between connecting member 20 and the bell-shaped member 28 by means of tie-rods, or studs, 46. Said brake comprises a cylinder 48 in which slides a piston 50 integral with an intermediate portion 52 of stem 32. Said piston 50, inside cylinder 48, defines two chambers 54 and 56 filled with a liquid of the organic type, said chambers communicating with each other by means of calibrated passages constituted, in the embodiment of FIG. 1, by outer conduits 58. O-rings 60 are provided for insuring tightness between portion 52 of the stem and cylinder 48 and between piston 50 and said cylinder.

Owing to said hydraulic brake 44, as will be clearly understood on reading the description of the operation of the safety valve according to the present invention, the high-frequency oscillations of the valve movable parts induced by a rise of the pressure within the enclosure, when the fluid contained therein is incompressible, are completely cancelled, so that the risk of scuffing said movable parts is eliminated. Moreover, the flow of the fluid from the enclosure is improved with respect to conventional valves, since said flow varies uniformly instead of in a pulsating manner.

In order that hydraulic brake 44 may be inserted into a conventional safety valve, said brake is designed as a sub-assembly capable of being mounted and dismounted in one piece. To that end, stem 32 is constituted by three aligned embedded portions 61, 52 and 63, respectively guided by screw 38 as regards portion 61 carrying shoulder 42 on which rests spring 34, by cylinder 48 as regards portion 52 carrying piston 50, and by a guiding device 62 integral with a plate 64 mounted between cylinder 48 and connecting member 20, as regards portion 63 carrying flap 30.

As shown in FIG. 1, flap 30 is attached to the free end of portion 63 of stem 32 and is provided with an insert 66 that is sealingly applied against seat 18. A second plate 68 is squeezed between plate 64 and connecting member 20. A sealing bellows 70 is mounted about the stem portion 63 carrying flap 30 and about the guiding device 62 between plate 68 and flap 30 to which it is sealingly connected. Preferably, the air trapped in bellows 70 communicates with the atmosphere by means of passages 72 provided in plate 64, said passages opening into a chamber 74 formed in cylinder 48, said chamber 74 communicating with the outside by means of passage 76.

The safety valve shown in FIG. 1 operates as follows:

in the absence of any pressure within enclosure 10, or whenever the pressure within said enclosure is lower than a limit value determined by spring 34, said spring biasses downwards (according to FIG. 1) the valve movable portion constituted by stem 32 and flap 30, so that portion 66 of said flap is sealingly applied against seat 18 formed on tube 16 communicating with the enclosure.

On the other hand, whenever the pressure within enclosure 10 rises above the limit value as determined by spring 34, the fluid contained in said enclosure causes flap 30 to rise away from seat 18, so that a portion of the fluid is drained via opening 22 of connecting member 20, towards a secondary circuit (not shown). Such a drainage of a certain amount of fluid causes the pressure within the enclosure to decrease, said pressure thus becoming again lower than the limit value determined by the spring. The latter then biasses the valve movable portion downwards again, so that flap 30 is again sealingly applied against seat 18. If the pressure within the enclosure continues to rise, it again reaches a sufficient level for raising the flap away from its seat, which causes the fluid to be drained again and the valve to be closed again. If the pressure within enclosure 10 rises in continuous fashion, the phenomenon is endlessly reproduced, which causes the valve to beat.

By means of hydraulic brake 44, and whether the fluid contained in enclosure 10 is compressible or not, all the high-frequency oscillations of the movable portion of valve 14 are prevented indeed, the calibrated passages constituted by conduits 58 between chambers 54 and 56 of hydraulic brake 44, permit to damp down the movable portion vibrations induced by the above-mentioned beat-phenomenon. It follows that the overheating due to friction is reduced and that there is no longer any risk of scuffing. In addition, in view of the fact that the valve movable portion is damped down, the flow of fluid from enclosure 10 resulting from the operation of safety valve 14 varies uniformly, instead of in a pulsating manner in the safety valves of the prior art.

Figure 2:
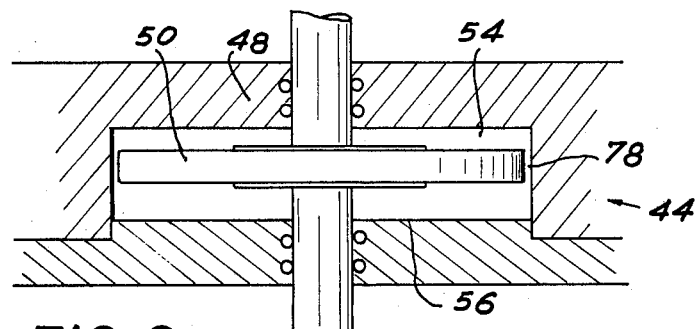
FIG. 2 is a diagramatic cross-section illustrating a variant of the hydraulic brake incorporated into the valve shown in FIG. 1.

In the embodiment shown in FIG. 2, the outer conduits 58 through which chambers 54 and 56 communicate with each other are no longer to be found; they are replaced by a clearance 78 between the outer periphery of piston 50 and cylinder 48. In the same manner as conduit 58 of FIG. 1, said clearance 78 forms a calibrated passage permitting chambers 54 and 56 to communicate with each other. The damping effect achieved by hydraulic brake 44 is thus obtained even if chambers 54 and 56 are filled with an organic liquid.

Figure 3:
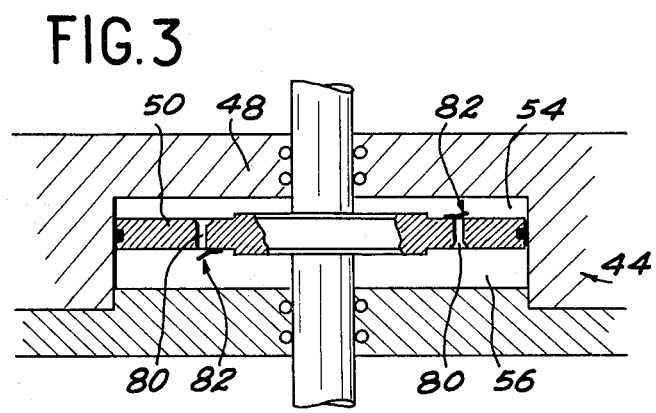
FIG. 3 is a view similar to FIG. 2, corresponding to another variant.

In the embodiment shown in FIG. 3, chambers 54 and 56 of hydraulic brake 44 are caused to communication by means of two holes, or ports 80 of piston 50, opening into said two chambers.

Moreover, in the latter embodiment, non-return (or one-way) flaps diagramatically shown at 82, serve to control the flow of liquid through each of said holes 80, said flaps being so mounted that one of them obturates one of the holes 80 when stem 32 moves in a first direction, whereas the other flap obturates the other hole 80 when said stem moves in the opposite direction. That feature makes it possible, by making the holes 80 of different sizes, to damp down the valve movable portion differently according as the opening or the closing of said valve is concerned.

It will be easily understood that it is possible to combine the various embodiments described with reference to FIGS. 1 to 3. Accordingly, in particular as regards the embodiment shown in FIG. 1, the conduits 58 could also be provided with flaps and could be of different cross-sections in order to damp down the valve movable portion differently according as the opening or the closing of said valve is concerned. In addition, the latter feature, permitting to control and distinguish the valve opening and closing steps from each other is independant of the nature of the fluid contained in the enclosure to be controlled and justifies the use of such a safety valve when said fluid is compressible.

Quite obviously, the scope of the present invention is not restricted to the above-described embodiments. Thus, for instance, piston 50 used in each of the above three variants might be exchanged for a flexible metal diaphragm, fixed both to stem 32 in its middle portion and to cylinder 48 at the periphery thereof. Again, the hydraulic brake might be directly integrated in a valve of novel design, instead of being inserted in a conventional valve, as illustrated in FIG. 1.

What is claimed is:

1. A safety valve for relief of pressure from a fluid-filled enclosure, comprising a valve unit, a hydraulic brake sub-assembly and a return spring sub-assembly aligned in that order along a common axis:

said valve unit having a connecting member for fluid tight connection with the enclosure, said member being formed with passage means communicating an inlet aligned with said common axis and an outlet, said inlet having a valve seat concentric with said common axis, a valve member mounted within said passage for movement along said common axis toward and away from said valve seat, said valve member having a first stem section sealingly projecting out of said connecting member toward said hydraulic brake sub-assembly;

said hydraulic brake sub-assembly having cylinder means with axially opposed radial surfaces, a partition in said cylinder means and defining therewith two liquid filled variable volume chambers, calibrated flow means providing a restricted flow path between said chambers, and a second stem section fastened to said partition and axially projecting out of said cylinder for aligned abutting connection of one end of said second stem section with said first stem section;

said return spring sub-assembly including a bell-shaped housing, a third stem section axially slidably received in said housing, calibrated spring means having one end engaging said third stem at the end thereof closest to said hydraulic brake sub-assembly and the other end engaging said housing forcing said third stem section into aligned abutting connection with said second stem section; and fastening means removably clamping said hydraulic brake sub-assembly between said valve and said return spring sub-assembly with said opposed end radial surfaces of said cylinder means in contact with cooperating end surfaces of said connecting member and said housing respectively.

2. A safety valve according to claim 1 in which said partition is a piston sliding within said cylinder.

3. A safety valve according to claim 2 in which said calibrated flow means is a conduit exterior to said cylinder and communicating said two variable volume chambers.

4. A safety valve according to claim 1 or 2 in which said calibrated flow means is an opening through said partition communicating with said two chambers.

5. A safety valve according to claim 1 or 2 in which said variable volume chambers communicate with each other by means of at least two passages of different cross sections extending through said partition, each passage having a check valve therein to permit flow in opposite directions only in each passage.

6. A safety valve according to claim 2 in which said calibrated flow means is constituted by a peripheral clearance between said piston and said cylinder.

* * * * *